United States Patent [19]
Baer

[11] Patent Number: 5,024,183
[45] Date of Patent: Jun. 18, 1991

[54] ANIMAL TRAINING DEVICE

[76] Inventor: William G. Baer, 4500 Homestead, Littleton, Colo. 80123

[21] Appl. No.: 513,615

[22] Filed: Apr. 24, 1990

[51] Int. Cl.⁵ .............................................. A01K 29/00
[52] U.S. Cl. ............................................ 119/29; 43/81
[58] Field of Search ............................ 119/29, 29.5, 1; 43/81 R, 90

[56] References Cited
U.S. PATENT DOCUMENTS

| | | | |
|---|---|---|---|
| 1,603,222 | 10/1926 | Transue | 119/29 |
| 2,837,056 | 6/1958 | Kanta | 119/29 |
| 3,172,393 | 3/1965 | Breland | 119/29 |
| 3,570,457 | 7/1969 | Curtis | 119/29 |
| 4,779,374 | 10/1988 | Feldman | 43/81 |

FOREIGN PATENT DOCUMENTS 282589  5/1914  Fed. Rep. of Germany ........ 119/29

Primary Examiner—John G. Weiss
Attorney, Agent, or Firm—Edna M. O'Connor

[57] ABSTRACT

An effective, dependable, and humane animal training device employs negative reinforcement to discourage undesired behavior in household pets, especially dogs. An ordinary mousetrap is combined with a flapper which attaches to the spring biased jaw or spring member. This flapper includes a broad face which moves suddenly when the trap is sprung startling but not injuring the animal when triggered by the animal during the inappropriate behavior. The flapper is generally planar and includes molded-in score lines to guide the trimming of the flapper to accommodate different sized dogs.

17 Claims, 1 Drawing Sheet

ANIMAL TRAINING DEVICE

BACKGROUND OF THE INVENTION

This invention relates to the field of animal training devices, and in particular to that area which includes devices to train dogs to avoid certain objects or areas. Thus dog training devices in accordance with the instant invention can be used to teach a dog to avoid certain areas, rooms, or pieces of furniture. It also can be used to teach a dog to stay out of trash or away from other objectionable objects.

Prior training devices such as shown by the Kanta patent, U.S. Pat. No. 2,837,056 have been used to teach a dog to avoid strange foods. Such training is achieved by placing food in a spring like trap. The dog is thus subject to pain when he attempts to retrieve the food. This type of training device may now be considered inhumane. The spring loaded loop is intended to cause discomfort and pain and the exploding cap, used to startle the dog, would be a shock to the dog's heightened hearing ability. Also the dog that undergoes the punishment of the device still gets the food as a reward. This simultaneous reward and punishment can be contradictory and confusing to the animal. This disclosed device includes a spike for sticking it to the ground. Also, there is no provision for adjusting the device to match the size of the dog being trained.

The training device of Breland, U.S. Pat. No. 3,172,393, in contrast uses a noise as positive feedback for training. The noise is associated with a food reward and also is directly connected to the owner or trainer. Breland does not discuss training to discourage inappropriate behavior.

In contrast, the patent to Curtis, U.S. Pat. No. 3,570,457 teaches the use of noise to train a misbehaving dog. This method of training is similar to the age old practice of throwing a shoe at the animal when it misbehaves. Most importantly, the operator needs to be present and needs to catch the dog in the act. The dog will soon realize that the operator or trainer is responsible for the noise, and thus will associate the trainer with the punishment. Furthermore, the device is not one that can be easily carried, so the operator may lack time to locate the noisemaker when the dog is participating in the objectionable behavior. If the noise is not produced when the dog is involved in the inappropriate activity, the dog will not learn to associate the noise with his improper activity.

It is known in dog training literature that a set mousetrap covered with newspapers can be used to scare and punish a dog that approaches and disturbs a forbidden object or area. Such a "trap" can be dangerous to both the operator and the dog as well as those unaware of it including children. The newspaper can visually cover the temptation thus making the dog less likely to learn what to avoid. Generally, dogs dislike stepping on a single sheet of newspaper if it is placed on a soft surface like a chair or a carpet, thus the paper (and likely the set trap hidden beneath the paper) will be avoided and the dog will not learn from the set trap. Also the owner may forget the exact location of the trap and injure himself while trying to move or step over the hidden set trap. Conversely, the wind or the like might shift the newspaper and thus expose the unshielded trap to the dog.

SUMMARY OF THE INVENTION

It is an object of the present invention to overcome the disadvantages of the prior art by providing an effective and humane dog training device which can be used without the intervention of the owner or trainer.

It is a further object of the invention to provide a dog training device which can punish the dog for approaching restricted rooms or areas, pieces of furniture, or objects such as trash. The punishment the dog receives occurs in the same location as the restricted area or object.

It is an object of the invention to provide an animal training device that is intended to correct improper behavior at the exact time when it occurs and where such a correction will have the greatest impact in modifying the undesirable behavior. The punishment for the improper behavior can occur without the intervention of the owner or trainer so the dog will not become fearful of the humans involved. The owner need not be skilled in dog training techniques. Also, the burden will not be on the owner or trainer to catch the dog in the act of performing the misdeed.

BRIEF DESCRIPTION OF THE INVENTION

The instant invention provides an animal training device to be placed near objects and area that the user wishes a dog or other animal to avoid. The training device has a flapper portion with a generally broad surface which is capable of being spring tensioned into a tensioned position. Release means activated as the animal touches the training device is provided to release the flapper portion from its tensioned position to a released position. Upon release the flapper portion strikes the animal and scares it away from the object or area.

The invention also includes a flapper attachment for a mousetrap. The mousetrap and flapper attachment can be placed near selected areas and objects to frighten animals away.

The instant invention also encompasses the method of training a dog or other animal to avoid a selected object or area.

The foregoing is but a brief description of some of the features of the present invention. These and other features are more fully described in the specification set forth below and as embraced by the appended claims.

BRIEF DESCRIPTION OF THE DRAWINGS

While the specification concludes with claims particularly pointing out and distincly claiming the present invention, the invention will be more readily understood from the following descriptions of the preferred embodiments which are given by way or example with the accompanying drawings in which:

DESCRIPTION OF THE PREFERRED EMBODIMENT

Figure 1:
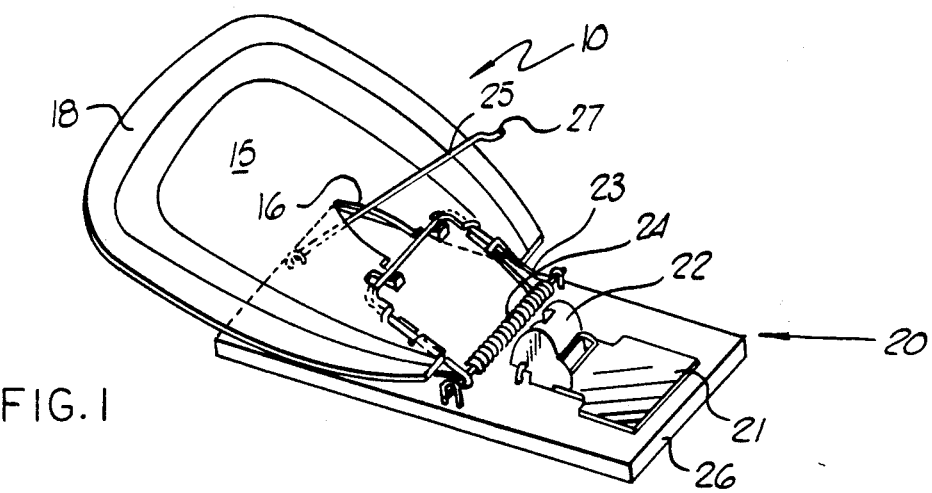
FIG. 1 is a perspective view of a device taught by the instant invention showing the parts just prior to their securement in the tensioned position.

In FIG. 1, the animal or dog training device is shown at 10. In the preferred embodiment the device comprises flapper portion 18 attached to mousetrap 20. The mousetrap is any ordinary mousetrap as is well known in the art and comprises base 26 generally made out of wood, spring member 23 tensioned by coil spring 24, tension rod or member 25 for setting the trap, a generally u-shaped catch 22 for securing the curved end portion 27 of member 25, and release 21. Elements 23, 24, and 25 are preferably made of metal wire while elements 22 and 21 can be made of suitable plastic, wood, or metal. FIG. 1 shows the mousetrap with attached flapper just prior to securement in a tensioned position. In the released position, prior to setting, spring member 23 with attached flapper lies on the same side of trap 20 as release 21 and tension member 25 is loose and free moving.

Figure 2:
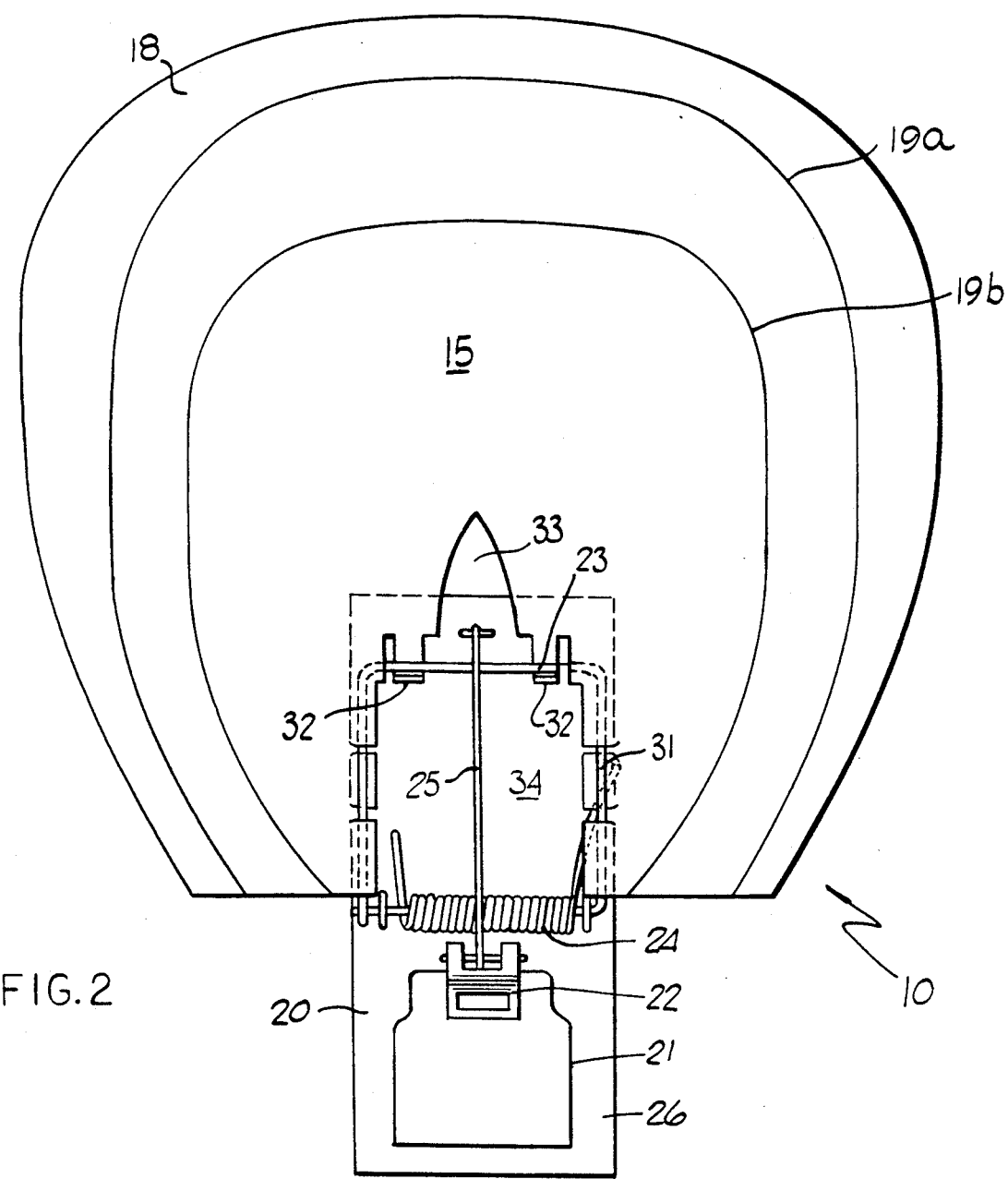
FIG. 2 is a top view of the device showing the parts tensioned for use in a selected area or on a selected object.

In FIG. 2 the animal or dog training device 10 is shown in the tensioned position. It is thus ready to be placed on an object or area that a trainer or owner desires to teach a dog or animal to avoid. (It is preferable to tension the device after placement on the selected object or area to avoid accidental release of the trap and startling the owner or trainer).

Flapper 18 comprises a generally planar member 15 having a broad face, preferably made of injection molded plastic. Member 15 is attached to the U-shaped portion of spring member 23 of a mousetrap by means of a grooved channel 31 along opposite sides of a rectangular cutout 34 in the member. Channel 31 can be a continuous groove or a series of oppositely facing grooved fingers as shown depending on the molding process. The flapper 18 is retained in this engaged position by hooked clips 32 which attach to the laterally extending side of the spring member 23.

The flapper member 15 is fairly stiff such that the flapper can be supported at its central portion by the spring member 23, but is thin enough so that it can be cut to size using scissors to accommodate various sized dogs or animals. It has been found that the smaller the dog or animal to be trained, the larger the flapper should be to distribute the force of its impact. Thus, molded—in score lines or marks can be provided on planar member 15 to indicate cutting lines to size the flapper to the corresponding suggested range of weights of the animal. For example, score line 19a is intended to show the trimmed size for a dog 30-70 lbs., while line 19b is the trim line for a dog over 70 lbs. Untrimmed, the flapper 18 is appropriately sized for dogs 30 pound or less. Member 15 is provided with an aperture or cutout 34 for member 25 to pass through in the tensioned position of the device.

The method of dog training will now be described with reference to the apparatus shown in the figures. The method is designed to modify the following improper behaviors: getting into the trash, jumping up on the furniture, grabbing food from the kitchen counters and tables, lying against drapes, going into unauthorized room or areas, digging in potted plants and the yard, chewing, housebreaking problems, and other behavior problems too numerous to mention.

When the owner or trainer desires to break the dog or animal of one of the above improper behaviors, he places the device of the instant invention at the site of the improper behavior. The owner or trainer can then leave and allow the device to train the dog. This will greatly lessen the dogs fear of humans.

In practice, the owner or trainer will first place flapper 18 on an ordinary mousetrap. The plastic flapper will have enought flexibility for the grooved fingers 32 and channel 31 to grip the spring member 23. The flapper 18 and spring member will still be in their released position on the same side of the trap is release 21. The flapper 18 and spring member 23 are biased in the release position (not shown) by the force of spring 24. To tension the device the owner or trainer will then move the spring member 23 and attached flapper 15 to the tensioned position shown in FIG. 2 against the force of spring 24. Tension member 25 will pass through aperture 33 and the curved portion 27 will engage catch 22 to secure the spring member 23 and flapper 18 in the tensioned position. At this point release 21 will be slightly raised from base 26.

As the dog or other animal approaches the site of the improper behavior he will hopefully touch the release 21. This will disengage catch 22. The release of tension member 25 will cause flapper 18 to move in an arcuate path under the force of spring 24 to strike the dog on the muzzle. The dog or animal however will not be seriously injured by the plastic flapper and hopefully through repetition of the same procedure will learn to avoid the site of the improper behavior. The sudden movement of the flapper, even if it misses the dog, can be effective in scaring or startling the dog and thus effecting a self-imposed negative feedback. The dog or animal will associate their misdeed with the negative stimuli (noise and impact) and thus such behavior becomes something to avoid in the future.

While the preferred embodiment of this invention has been fully described in order to adequately explain the principles of the invention, it is understood that various modifications or alterations or other embodiments may be utilized without departing from the scope of the appended claims. For example, although a particular mousetrap has been described, any well known spring biased mechanism can be used. The flapper could be made in other shapes and from other materials than that shown, for example in the shape of a piece of trash. The upper surface of the flapper could also include a layer of adhesive to hold a typical piece of trash to conceal it amongst other trash items, if for example the animal's habit of exploring garbage or trash bins is to be discouraged.

I claim:

1. An animal training device comprising a generally thin, generally planar flapper portion having a generally broad face, a spring means for tensioning said flapper portion in a first tensioned position, a release means for releasing said spring means and for releasing said flapper portion from said tensioned position and causing said flapper portion to move in a path to a second released position.

2. An animal training device of claim 1 wherein said release means is activated by the movement of an animal.

3. An animal training device of claim 1 wherein said flapper portion is generally stiff.

4. An animal training device of claim 1 wherein said spring means comprises a tension member in contact with said release means in said tensioned position.

5. An animal training device of claim 4 wherein said tension member is released from contact with said release means in said released position.

6. An animal training device of claim 5 wherein said release means comprises catch means and trigger means, said catch means contacts said tension member in said tensioned position, said trigger means releases said tension member in said released position.

7. An animal training device of claim 4 wherein said flapper portion has an aperture and said tension member passes through said aperture in said tensioned position.

8. An animal training attachment for a mousetrap type device, said mousetrap type device comprising spring means, tension means for tensioning said spring means in a tensioned position, catch means for contacting said tension means in said tensioned position of said spring means, release means for releasing said catch means and said tension means and allowing said spring means to move from said tensioned position to a release position, said animal training device comprising a generally thin, generally planar flapper portion having a generally broad face, and attachment means located on said flapper portion for attaching said device to said spring means of said mousetrap type device, said flapper having a stiffness such that it can be supported by said spring member through said attachment means.

9. An animal training attachment of claim 8 wherein said attachment means comprise grooves for slidably receiving said spring means of said mousetrap type device.

10. An animal training attachment of claim 9 wherein said attachment means further comprises securing clips for securing said training device on said spring means of said mousetrap type device.

11. An animal training attachment of claim 8 wherein said attachment means are releasable.

12. An animal training attachment for a mousetrap type device, said mousetrap type device comprising spring means, tension means for tensioning said spring means in a tensioned position, catch means for contacting said tension means in said tensioned position of said spring means, release means for releasing said catch means and said tension means and allowing said spring means to move from said tensioned position to a release position, said animal training attachment comprising a flapper portion having a generally broad face, and attachment means for attaching said device to said spring means of said mousetrap type device wherein said flapper portion is generally planar and has marks to indicate cutting lines for various sized animals.

13. A method of training an animal to avoid selected areas and objects comprising the steps of
providing a spring loaded, generally thin, stiff, generally planar, generally broad faced flapper means on said selected area or object,
securing said spring loaded flapper means in a tensioned position,
providing release means actuated by the movement of an animal for releasing said spring loaded flapper from said tensioned position to a release position,
moving said flapper upon release along a path from said tensioned position to said released position so that said flapper strikes said animal.

14. A method of claim 13 wherein said step of moving further comprises the step of moving said flapper upon release along an arcuate path from said tensioned position to said released position.

15. A method of claim 14 wherein said step of moving further comprises the step of moving said flapper so as to startle said animal.

16. A dog training device comprising a generally thin, generally planar flapper portion having a generally broad face, a spring means for tensioning said flapper portion in a first tensioned position, a release means for releasing said spring means and for releasing said flapper portion from said tensioned position in response to contact by a dog, whereby said flapper portion is moved in a path to a second released position.

17. An animal training device comprising a flapper portion having a generally broad face, a spring means for tensioning said flapper portion in a first tensioned position, a release means for releasing said spring means and for releasing said flapper portion from said tensioned position and causing said flapper portion to move in a path to a second released position, wherein said flapper portion is generally planar and has marks to indicate various cutting lines to adjust the flapper to correspond to various sized animals.

* * * * *